US010830337B2

(12) United States Patent
Kim (10) Patent No.: US 10,830,337 B2
(45) Date of Patent: Nov. 10, 2020

(54) MULTIFUNCTIONAL ELECTRONIC GEAR SHIFT LEVER FOR SIMULTANEOUS MANIPULATION AND METHOD OF CONTROLLING THE SAME

(71) Applicants: HYUNDAI MOTOR COMPANY, Seoul (KR); KIA MOTORS CORPORATION, Seoul (KR)

(72) Inventor: Eun-Sik Kim, Gwangmyeong-si (KR)

(73) Assignees: Hyundai Motor Company, Seoul (KR); Kia Motors Corporation, Seoul (KR)

(*) Notice: Subject to any disclaimer, the term of this patent is extended or adjusted under 35 U.S.C. 154(b) by 389 days.

(21) Appl. No.: 15/901,593

(22) Filed: Feb. 21, 2018

(65) Prior Publication Data

US 2018/0180172 A1    Jun. 28, 2018

Related U.S. Application Data

(62) Division of application No. 14/940,106, filed on Nov. 12, 2015, now Pat. No. 9,933,068.

(30) Foreign Application Priority Data

Nov. 14, 2014    (KR) .......................... 10-2014-0158672

(51) Int. Cl.
*B60K 6/00*    (2006.01)
*G05G 9/00*    (2006.01)
(Continued)

(52) U.S. Cl.
CPC .......... *F16H 59/08* (2013.01); *F16H 59/0217* (2013.01); *F02D 41/0225* (2013.01); (Continued)

(58) Field of Classification Search
CPC ............... F16H 59/08; F16H 2059/081; F16H 59/0217; F16H 2063/423; F16H 2061/241; B60K 2350/102
See application file for complete search history.

(56) References Cited

U.S. PATENT DOCUMENTS 6,564,661 B2    5/2003    DeJonge
6,927,671 B2    8/2005    DeBono
(Continued)

FOREIGN PATENT DOCUMENTS

CN    101341357 A    1/2009
JP    2002-283868 A    10/2002
(Continued)

OTHER PUBLICATIONS

U.S. Notice of Allowance dated Dec. 15, 2017 issued in U.S. Appl. No. 14/940,106.
(Continued)

*Primary Examiner* — Jake Cook
(74) *Attorney, Agent, or Firm* — Morgan, Lewis & Bockius LLP (57) ABSTRACT

A multifunctional electronic gear shift lever for simultaneous manipulation includes a cylindrical lever rotatably inserted into a support which is disposed in a center fascia surface or a console surface of a vehicle and having an entrance opening that penetrates the cylindrical lever in a longitudinal direction. A start button is disposed at a lower side of the entrance opening, connected with a controller via a spring, and moving in a vertical direction. A display is disposed on the center fascia surface or the console surface, and displays a gear shift stage of the vehicle and a state of the vehicle. The gear shift stage is changeable by rotating the cylindrical lever while simultaneously starting an engine of the vehicle by operating the start button.

10 Claims, 6 Drawing Sheets

(51) Int. Cl.
*F16H 59/08* (2006.01)
*F16H 59/02* (2006.01)
*F02D 41/06* (2006.01)
*F02D 41/02* (2006.01)
*F16H 63/42* (2006.01)

(52) U.S. Cl.
CPC ........ *F02D 41/062* (2013.01); *F02D 2200/60* (2013.01); *F16H 2059/081* (2013.01); *F16H 2063/423* (2013.01)

(56) References Cited

U.S. PATENT DOCUMENTS

| | | |
|---|---|---|
| 8,264,338 B2 | 9/2012 | Leon |
| 2003/0029261 A1 | 2/2003 | DeJonge |
| 2006/0169085 A1 | 8/2006 | Peuster |
| 2009/0000407 A1 | 1/2009 | Meyer et al. |
| 2009/0000413 A1 | 1/2009 | Furhoff et al. |

FOREIGN PATENT DOCUMENTS

| | | |
|---|---|---|
| JP | 2006-502911 A | 1/2006 |
| JP | 2012-254775 A | 12/2012 |
| KR | 10-2011-0072942 A | 6/2011 |
| KR | 10-2012-0139881 A | 12/2012 |
| KR | 10-1315493 B1 | 10/2013 |
| KR | 10-1511561 B1 | 4/2015 |

OTHER PUBLICATIONS

U.S. Non-Final Office Action dated Aug. 15, 2017 issued in U.S. Appl. No. 14/940,106.

MULTIFUNCTIONAL ELECTRONIC GEAR SHIFT LEVER FOR SIMULTANEOUS MANIPULATION AND METHOD OF CONTROLLING THE SAME

CROSS-REFERENCE TO RELATED APPLICATIONS

This application is a divisional patent application of U.S. patent application Ser. No. 14/940,106, filed on Nov. 12, 2015 which claims the benefit of priority to under 35 U.S.C. § 119 to Korean Patent Application No. 10-2014-158672, filed on Nov. 14, 2014, in the Korean Intellectual Property Office, the disclosures of which are incorporated herein by reference in their entireties.

TECHNICAL FIELD

The present disclosure relates to an electronic gear shift lever and a method of controlling the same, and more particularly, to a multifunctional electronic gear shift lever for simultaneous manipulation and a method of controlling the same, which allow performing identification of a driver, engine start, and a gear shift stage change at the same time.

BACKGROUND

A vehicle has a transmission for transmitting power generated by an engine to drive the vehicle while changing rotational force and speed depending on a driving state. The transmission is classified into a manual transmission and an automatic transmission.

A driver in the vehicle manipulates a gear shift lever, which is mounted on a console surface at the periphery of a driver's seat or mounted on a steering handle, so as to change a gear shift stage of the manual transmission or the automatic transmission to a desired gear shift stage.

The manual transmission is operated in a manner in which when the driver manipulates the gear shift lever to select a suitable gear for driving, the suitable gear desired by the driver is transmitted to the manual transmission through a cable or a rod. The automatic transmission is operated in a manner in which the driver turns on an inhibitor switch through a cable by moving the gear shift lever so as to transmit a movement desired by the driver to the automatic transmission.

Recently, the usage of an electronic gear shift lever, which substitutes a mechanical connection structure between the transmission and the gear shift lever using a mechanical gear shift lever with an electrical connection structure having an actuator and an electronic control unit (ECU) has been increased.

The electronic gear shift lever requires no mechanical cable connection structure unlike the mechanical gear shift lever, but requires a position sensor to convert driver's intention of shifting gears into an electronic signal thus to allow efficient and convenient manipulation of the gear shift lever.

The electronic gear shift lever is classified into a lever type electronic gear shift lever having an electronic gear shift lever which protrudes on a console surface of a vehicle to be manipulated forward and rearward, a dial type electronic gear shift lever having a cylindrical electronic gear shift lever mounted on a console surface of a vehicle and rotating leftward and rightward, a column type electronic gear shift lever having an electronic gear shift lever mounted at a side of a steering handle of a vehicle to be manipulated upward and downward, and a button type electronic gear shift lever having a button on which gear shift stages of a vehicle are indicated by being pressed.

However, in the lever type electronic gear shift lever in the related art, a trajectory of rectilinear movement thereof is significantly long because the driver needs to move the entire arm in a front and rear direction or in a left and right direction when manipulating the lever type electronic gear shift lever. Thus, the driver's head may be injured by colliding with the gear shift lever at the time of a vehicle collision because the gear shift lever protrudes above the console surface.

When the dial type electronic gear shift lever in the related art is used, a trajectory of rectilinear movement is hardly generated, however, stress is transferred on the driver's wrist and the manipulation of the dial type electronic gear shift lever is inconvenient because the driver has to manipulate the dial type electronic gear shift lever while rotating the wrist.

The column type electronic gear shift lever in the related art has an advantage in that a distance from the steering handle is short, however, a dynamic trajectory thereof is significantly long because the driver needs to twist the driver's arm to manipulate the column type electronic gear shift lever.

The button type electronic gear shift lever in the related art can be manipulated conveniently and intuitively, however all of a P-stage button, an R-stage button, an N-stage button, and a D-stage button need to be displayed within a limited space of the gear shift lever, and thus intervals between the buttons become short.

According to the electronic gear shift lever in the related art, since a start button of a vehicle and the gear shift lever are separated regardless of a vehicle type, a driver needs to manipulate the gear shift lever by moving the entire arm after an engine starts.

SUMMARY

The present disclosure has been made in an effort to provide a multifunctional electronic gear shift lever for simultaneous manipulation and a method of controlling the same, in which when a driver reaches his/her hands into an entrance opening of a cylindrical lever to start an engine by pressing a start button simultaneously with identifying the driver's identity and rotates the hand, a gear shift stage of a vehicle changes, such that a gear shift operation may be quickly and conveniently carried out.

The present disclosure has also been made in an effort to provide a multifunctional electronic gear shift lever for simultaneous manipulation and a method of controlling the same, in which a separate layout for a start button at an outside position is not necessary and protruding portion is eliminated, such that a layout of the interior of a vehicle is improved and there is no collision possibility at the time of a vehicle accident.

Technical problems to be achieved in the present disclosure are not limited to the aforementioned technical problems, and any other not-mentioned technical problems will be obviously understood from the description below by those skilled in the technical field to which the present disclosure pertains.

An exemplary embodiment of the present inventive concept, a multifunctional electronic gear shift lever for simultaneous manipulation includes a cylindrical lever rotatably inserted into a support which is disposed in a center fascia surface or a console surface of a vehicle and having an entrance opening which penetrates the cylindrical lever in a longitudinal direction. A start button is disposed at a lower side of the entrance opening, connected with a controller via a spring, and moves vertically. A display is disposed on the center fascia surface or the console surface, and displays a current gear shift stage of the vehicle and a state of the vehicle. The gear shift stage is changeable by rotating the cylindrical lever while simultaneously starting an engine by operating the start button.

The multifunctional electronic gear shift lever may further include a driver recognition sensor mounted on one surface of the entrance opening, recognizing information of a driver, and transferring the information to the controller.

The multifunctional electronic gear shift lever may further include a solenoid having a rod that is inserted into a plurality of through holes which are formed along a circumference of the cylindrical lever. A locking button is mounted on another surface of the entrance opening, and moves the rod of the solenoid rearward.

The multifunctional electronic gear shift lever may further include a plurality of lever magnets attached onto an outer surface of the cylindrical lever in the longitudinal direction and spaced apart from each other. A plurality of support magnets are attached onto an inner surface of the support in the longitudinal direction and spaced apart from each other. The lever magnets and the support magnets have different polarity.

Two or more lever magnets of the plurality of the lever magnets may extend up to a lower surface of the cylindrical lever.

According to another exemplary embodiment of the present inventive concept, a method of controlling a multifunctional electronic gear shift lever for simultaneous manipulation includes operating a start button which is disposed at a lower side of an entrance opening that penetrates a cylindrical lever that is rotatably inserted into a center fascia surface or a console surface of a vehicle. Rotation of the cylindrical lever is recognized by a controller and a gear shift stage of the vehicle is changed.

The method may further include transferring driver information, which is recognized by a driver recognition sensor mounted on one surface of the entrance opening, to the controller, prior to the step of operating the start button.

The method may further include moving a rod of a solenoid rearward by operating a locking button mounted on another surface of the entrance opening, and pulling the rod out of a plurality of through holes which are formed in the cylindrical lever, prior to the step of changing the gear shift stage.

According to the exemplary embodiments of the present inventive concept, the start button, the driver recognition sensor, the locking button, and the like are integrally configured in the entrance opening of the cylindrical lever, thereby simplifying a structure of the gear shift lever, and reducing production costs.

According to the exemplary embodiments of the present inventive concept, a gear shift operation of the vehicle is carried out by putting the driver's hand into the entrance opening and simply rotating the hand, thereby reducing a manipulation trajectory of the gear shift lever, and improving operating characteristics.

According to the exemplary embodiments of the present inventive concept, a separate layout of the start button is not necessary at an outside position, thereby improving layout utilization of the vehicle interior, and no protruding portion of the conventional mechanical gear shift is eliminated in the vehicle, thereby reducing a risk that the driver is injured at a vehicle collision.

According to the exemplary embodiments of the present inventive concept, it is possible to change the gear shift stage of the vehicle by rotating the driver's hand to the gear shift stage displayed on the display, such that manipulation of the gear shift lever is intuitive and aesthetic appearance is improved, thereby improving marketability of the vehicle.

DETAILED DESCRIPTION OF THE EMBODIMENTS

Hereinafter, the present disclosure will be described in detail with reference to the accompanying drawings so that those skilled in the technical field to which the present disclosure pertains may easily carry out the present disclosure. As those skilled in the art would realize, the described embodiments may be modified in various different ways, all without departing from the spirit or scope of the present disclosure.

A part irrelevant to the description will be omitted to clearly describe the present disclosure, and the same or similar constituent elements will be designated by the same reference numerals throughout the specification.

Terms or words used in the specification and the claims should not be interpreted as a general and dictionary meaning and should be interpreted as a meaning and a concept which conform to the technical spirit of the present disclosure based on a principle that an inventor can appropriately define a concept of a term in order to describe his/her own invention by the best method.

Figure 1:
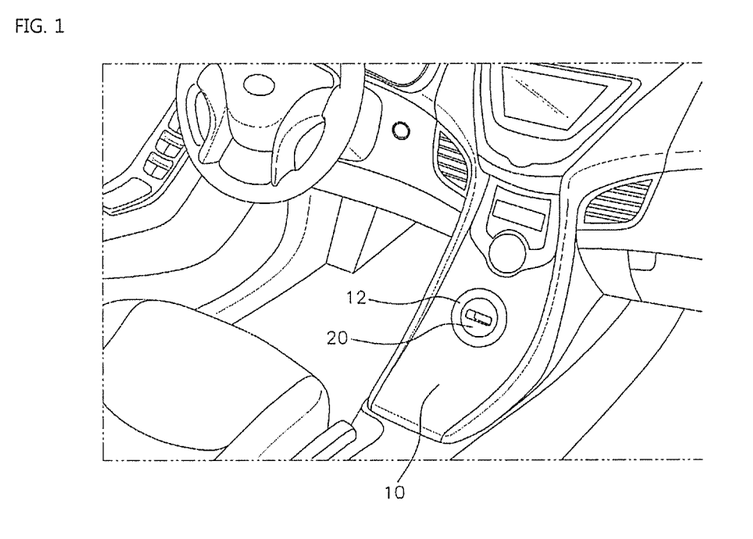
FIG. 1 is a schematic view of a vehicle interior in which a multifunctional electronic gear shift lever according to an exemplary embodiment of the present inventive concept is installed.
Figure 2:
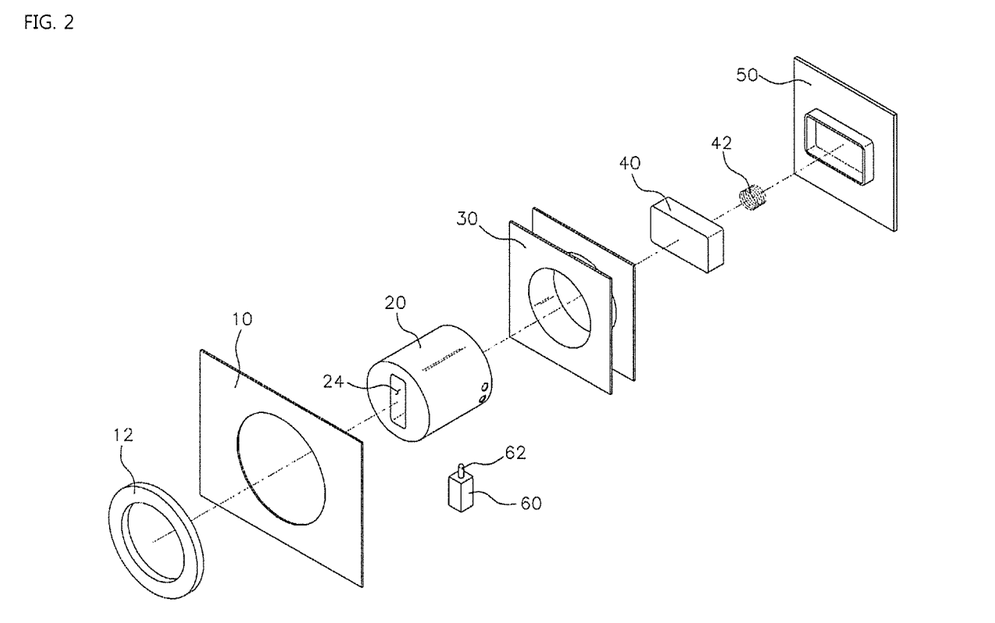
FIG. 2 is an exploded perspective view of the multifunctional electronic gear shift lever according to the exemplary embodiment of the present inventive concept.
Figure 3:
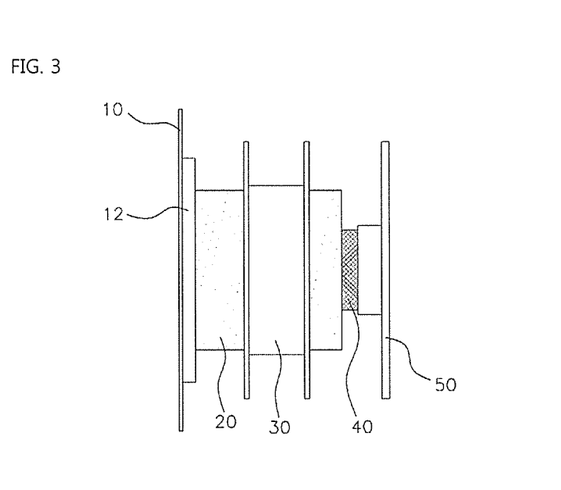
FIG. 3 is a side view of the multifunctional electronic gear shift lever according to the exemplary embodiment of the present inventive concept.
Figure 4:
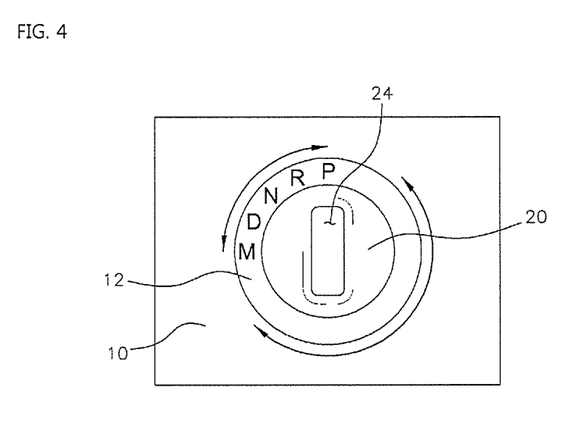
FIG. 4 is a top plan view of the multifunctional electronic gear shift lever according to the exemplary embodiment of the present inventive concept.

FIG. 1 is a schematic view of a vehicle interior in which a multifunctional electronic gear shift lever according to an exemplary embodiment of the present inventive concept is installed, FIG. 2 is an exploded perspective view of the multifunctional electronic gear shift lever according to the exemplary embodiment of the present inventive concept, FIG. 3 is a side view of the multifunctional electronic gear shift lever according to the exemplary embodiment of the present inventive concept, and FIG. 4 is a top plan view of the multifunctional electronic gear shift lever according to the exemplary embodiment of the present inventive concept.

As illustrated in FIG. 1, a multifunctional electronic gear shift lever according to an exemplary embodiment of the present inventive concept may be mounted on a center fascia surface or a console surface 10 that is disposed between a driver's seat and a front passenger's seat in a vehicle, but may be mounted in other places in accordance with design and the like of the vehicle.

In the center fascia surface or the console surface 10, a support 30, which has a hollow space formed at a center thereof, is fixedly coupled to other components (not illustrated) in the center fascia, and a cylindrical lever 20 is rotatably inserted into the support 30.

An entrance opening 24 penetrates a center of the cylindrical lever 20 in a longitudinal direction, and the entrance opening 24 may be large enough to allow a hand of a driver to enter and exit the entrance opening 24.

A start button 40 is connected with a controller 50, which is fixedly coupled to other components (not illustrated) in the center fascia, by a spring 42 and is disposed at a lower side of the entrance opening 24. The start button 40 vertically moves by elastic restoring force of the spring 42.

That is, the start button 40 is operated in a way that when the driver puts the hand into the entrance opening 24 and then presses the start button 40, the start button 40 moves downward while overcoming elastic force of the spring 42. When the driver releases the start button 40, the start button 40 is restored upward by the elastic force of the spring 42.

In this case, the controller 50 is in contact with the start button 40 to recognize the operation of the start button 40 and controls the vehicle. In other words, when the driver does not step on a brake pedal and presses the start button 40, the controller 50 operates an accessory (ACC) mode in which some electric devices such as an audio system may be used. When the driver steps on the brake pedal and then presses the start button 40, the controller 50 starts an engine.

As illustrated in FIG. 4, a display 12, which displays a state of a gear shift stage of the vehicle and a state of the vehicle, is installed on the center fascia surface or the console surface 10. The driver changes the gear shift stage of the vehicle into the gear shift stage displayed on the display 12 by rotating the cylindrical lever 20.

Figure 5:
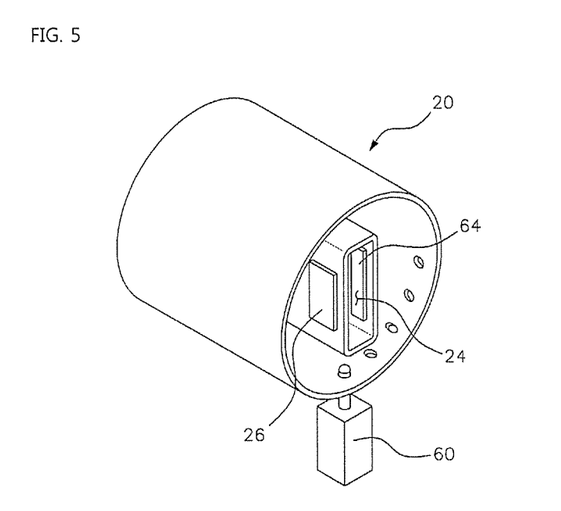
FIG. 5 is a perspective view illustrating an internal appearance of a cylindrical lever according to the exemplary embodiment of the present inventive concept.

FIG. 5 is a perspective view illustrating an internal appearance of a cylindrical lever according to an exemplary embodiment of the present inventive concept, and FIG. 6 is an exemplified view illustrating a state of the cylindrical lever in response to an operation of a solenoid according to an exemplary embodiment of the present inventive concept.

As illustrated in FIG. 5, a driver recognition sensor 26, which recognizes information about the driver and transfers the information to the controller 50, is mounted on one surface (left surface in the illustrated exemplary embodiment) of the entrance opening 24.

As the driver recognition sensor 26, a blood vessel pattern recognition sensor may be used. The blood vessel pattern recognition sensor analyzes information of blood vessels distributed under the skin of the back of a hand by using an infrared optical system and identifies an individual identity.

That is, when the driver puts the hand into the entrance opening 24, the infrared optical system recognizes the blood vessel pattern of the driver, and compares the blood vessel pattern with information stored in a database, and when the driver's identity is identified, the vehicle is properly operated.

In addition to the blood vessel pattern recognition sensor, various recognition sensors such as a finger print recognition sensor, a palm print recognition sensor, and the like may be used as the driver recognition sensor 26 in consideration of the type of vehicle, preference of driver, or the like.

Therefore, just by putting the hand into the entrance opening 24 formed in the cylindrical lever 20, the operations of identifying the driver's identity, starting the engine of the vehicle by pressing the start button 40, and changing the gear shift stage of the vehicle by rotating the cylindrical lever 20, may be performed at nearly the same time.

As illustrated in FIGS. 6A-6D, a plurality of through holes 28 are formed around the cylindrical lever 20. A solenoid 60, which has a rod 62 and moves forward and rearward, is inserted into/pulled out of the through hole 28 in the vicinity of the through holes 28.

A locking button 64 is installed on another surface (right surface in the illustrated exemplary embodiment) of the entrance opening 24, and the locking button 64 moves the rod 62 of the solenoid 60 rearward.

Figure 6A:
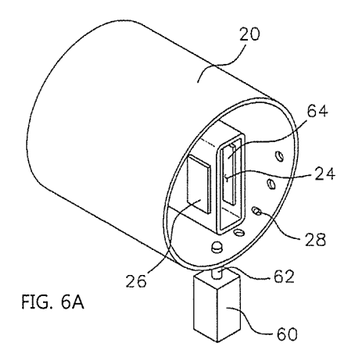
FIGS. 6A-6D are exemplified views illustrating states of a cylindrical lever in response to an operation of a solenoid according to an exemplary embodiment of the present inventive concept.

For example, in an initial state (P-stage state) as illustrated in FIG. 6A, the rod 62 of the solenoid 60 is inserted into the through hole 28, and as a result, the cylindrical lever 20 cannot rotate.

That is, the solenoid 60 performs a shift lock function that prevents erroneous manipulation of the driver during gear shifting, and thus, the driver cannot change the gear shift stage of the vehicle in a state in which the rod 62 of the solenoid 60 is inserted into the through hole 28.

Figure 6B:
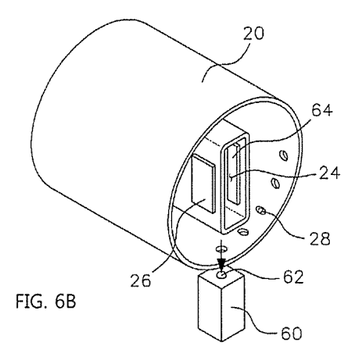
Figure 6C:
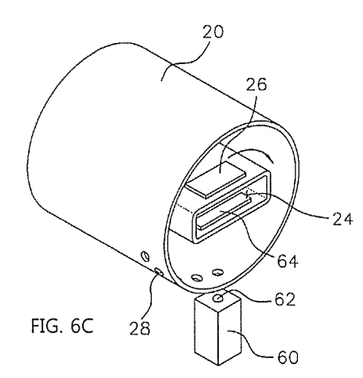

As illustrated in FIG. 6B, when the driver presses the locking button 64 by using a finger, the rod 62 moves rearward and then pulled out of the through hole 28, such that the driver can rotate the cylindrical lever 20 as illustrated in FIG. 6C.

Figure 6D:
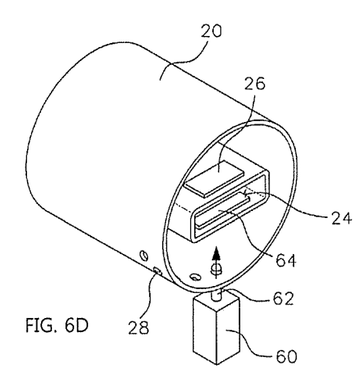

Finally, as illustrated in FIG. 6D, when the driver takes the hand off the locking button 64, the rod 62 moves forward again and then inserted into the through hole 28, and the cylindrical lever 20 returns back to the shift lock state in which the cylindrical lever 20 cannot rotate.

Figure 7A:
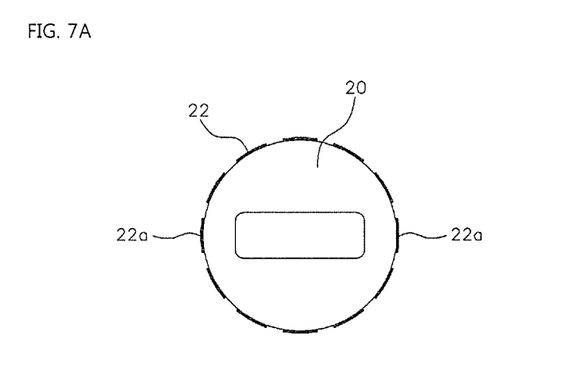
FIG. 7A is a top plan a lever magnet attached to the cylindrical lever according to an exemplary embodiment of the present inventive concept.
Figure 7B:
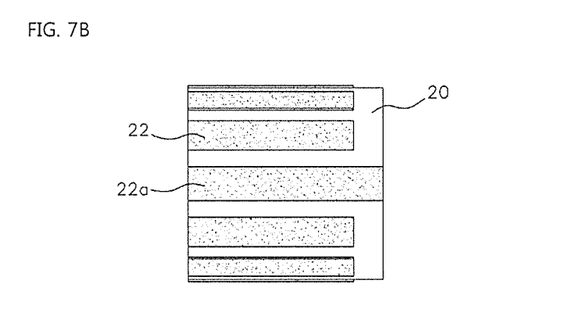
FIG. 7B is a side view of the cylindrical lever illustrated in FIG. 7A.
Figure 8:
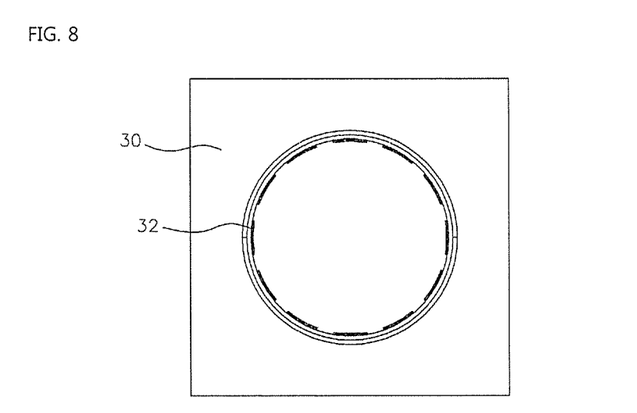
FIG. 8 is a top plan view a support magnet attached to a support according to an exemplary embodiment of the present inventive concept.

FIG. 7A is a top plan view of a lever magnet attached to the cylindrical lever according to the exemplary embodiment of the present inventive concept, FIG. 7B is a side view of the cylindrical lever illustrated in FIG. 7A, and FIG. 8 is a top plan view of a support magnet attached to a support according to the exemplary embodiment of the present inventive concept.

As illustrated in FIG. 7A, a plurality of lever magnets 22 are attached onto an outer surface of the cylindrical lever 20 in a longitudinal direction as being spaced apart from each other.

As illustrated in FIG. 8, a plurality of support magnets 32 are attached onto an inner surface of the support 30 in the longitudinal direction, and similar to the lever magnets 22, the support magnets 32 are spaced apart from each other.

The lever magnets 22 and the support magnets 32 are permanent magnets having different polarity, and allow a driver to sense shifting so that when the driver rotates the cylindrical lever 20, the driver may assuredly recognize the change in a gear shift stage.

As illustrated in FIG. 7B, two or more lever magnets 22a of the plurality of lever magnets 22 extend toward a lower surface of the cylindrical lever 20, and the remaining lever magnets 22 do not extend toward the lower surface of the cylindrical lever 20.

The two or more lever magnets 22a are disposed closer to the controller 50, which is disposed at the lower side of the cylindrical lever 20, than the other lever magnets 22, and transfer information about a degree of rotation of the cylindrical lever 20 to the controller 50.

A method of controlling the multifunctional electronic gear shift lever for simultaneous manipulation according to the present disclosure, which has been described above, will be described below.

Figure 9:
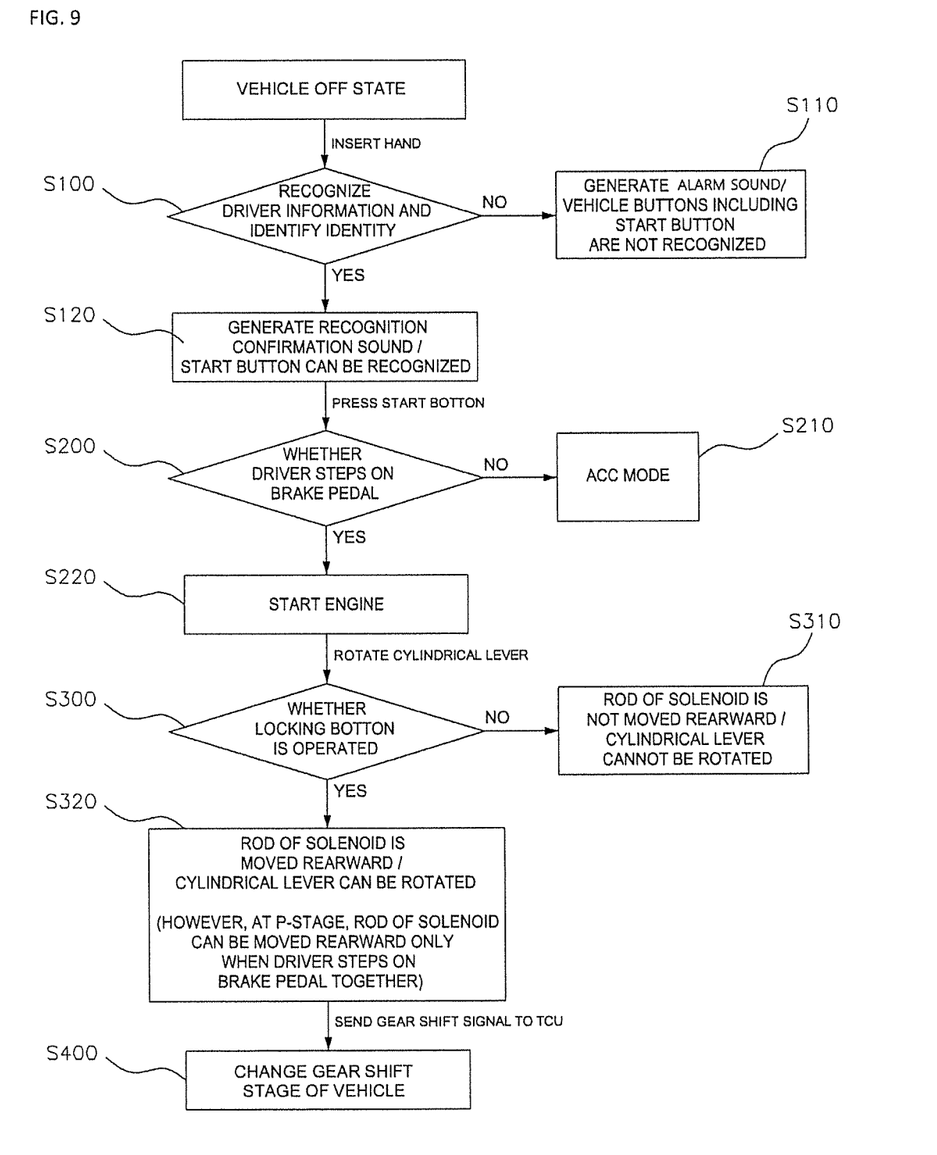
FIG. 9 is a flowchart illustrating a method of controlling a multifunctional electronic gear shift lever according to an exemplary embodiment of the present inventive concept.

FIG. 9 is a flowchart illustrating a method of controlling a multifunctional electronic gear shift lever according to an exemplary embodiment of the present inventive concept.

As illustrated in FIG. 9, a method of controlling the multifunctional electronic gear shift lever according to an exemplary embodiment of the present inventive concept includes operating the start button 40 which is disposed at a lower side of the entrance opening 24 that penetrates the cylindrical lever 20 that is rotatably inserted into the center fascia surface or the console surface of a vehicle (S200), and recognizing rotation of the cylindrical lever 20 by using the controller 50, and changing a gear shift stage of the vehicle (S400).

The method may further include transferring driver information, which is recognized by the driver recognition sensor 26 mounted on one surface of the entrance opening 24, to the controller 50 (S100), prior to the step of operating the start button 40. The method may further include moving the rod 62 of the solenoid 60 rearward by an operation of the locking button 64 mounted on the other surface of the entrance opening 24, and pulling the rod 62 out of the plurality of through holes 28 formed in the cylindrical lever 20 (S300), prior to the step of changing the gear shift stage.

According to the present disclosure, when the vehicle is off and the driver puts the hand into the entrance opening 24 of the cylindrical lever 20, the driver recognition sensor 26 recognizes the driver information, identifies the driver's identity, and then transfers the result to the controller 50 (S100).

In this case, as described above, a blood vessel pattern recognition sensor, a finger print recognition sensor, a palm print recognition sensor, or the like may be used as the driver recognition sensor 26, and the present disclosure is described based on the blood vessel pattern recognition sensor.

When the driver recognition sensor does not identify the driver's identity, an alarm sound such as a "beep" sound is generated, various types of buttons in the vehicle, including the start button, are not operated (S110). When the driver's identity is identified, a recognition confirmation sound such as a "ding dong dang" sound is generated, and the buttons in the vehicle, including the start button, may be operated (S120).

Next, when the driver presses the start button 40, the controller 50 confirms whether the driver presses the start button 40 while stepping on a brake pedal (S200). When the driver presses the start button 40 without stepping on the brake pedal, an ACC mode of the vehicle starts (S210), and when the driver presses the start button 40 while stepping on the brake pedal, a vehicle engine starts (S220).

When the driver rotates the cylindrical lever 20 by turning the hand in a state in which the engine starts, whether the locking button 64 is operated is confirmed (S300). When the locking button 64 is not operated, the rod 62 of the solenoid 60 does not move rearward, such that the cylindrical lever 20 cannot rotate (S310). When the locking button 64 is operated, the rod of the solenoid 60 moves rearward, such that the cylindrical lever 20 can rotate (S320).

When the gear shift stage of the vehicle is in a P-stage state, the cylindrical lever 20 can rotate only when the driver steps on the brake pedal along with the operation of the locking button 64. The controller 50 recognizes the rotation of the cylindrical lever 20, and sends a gear shift signal to a transmission control unit (TCU), thereby changing the gear shift stage of the vehicle (S400).

The aforementioned present disclosure is not limited to the aforementioned exemplary embodiment and the accompanying drawings, and it will be obvious to those skilled in the technical field to which the present disclosure pertains that various substitutions, modifications, and changes may be made without departing from the technical spirit of the present disclosure.

What is claimed is:

1. A method of controlling a multifunctional electronic gear shift lever for simultaneous manipulation, the method comprising:
    operating a start button disposed at a lower side of an entrance opening which penetrates a cylindrical lever that is rotatably inserted into a center fascia surface or a console surface of a vehicle to start an engine;
    recognizing, by a controller, rotation of the cylindrical lever and changing a gear shift stage of the vehicle; and
    transferring driver information, which is recognized by a driver recognition sensor mounted on one surface of the entrance opening, to the controller, prior to the operating a start button.

2. The method of claim 1, further comprising moving a rod of a solenoid rearward by an operation of a locking button mounted on another surface of the entrance opening and pulling the rod out of a plurality of through holes formed in the cylindrical lever, prior to the changing a gear shift stage.

3. The method of claim 1, wherein, when the driver recognition sensor does not recognize the driver information while a driver's hand is in the entrance opening, an alarm sound is generated and the start button does not operate.

4. The method of claim 1, wherein, when the driver recognition sensor recognizes the driver information while a driver's hand is in the entrance opening, a recognition confirmation sound is generated and the start button is operated.

5. The method of claim 1, wherein the step of operating a start button includes confirming, by the controller, whether a driver presses the start button while stepping on a brake pedal when the driver presses the start button.

6. The method of claim 5, wherein, when the driver presses the start button without stepping on the brake pedal, an accessory (ACC) mode starts.

7. The method of claim 5, wherein, when the driver presses the start button while stepping on the brake pedal, the engine starts.

8. The method of claim 2, wherein the moving a rod includes confirming whether the locking button is operated.

9. The method of claim 8, wherein, when the locking button does not operate, the rod does not move rearward, such that the cylindrical lever does not rotate.

10. The method of claim 8, wherein, when the locking button operates, the rod moves rearward, such that the cylindrical lever rotates.

* * * * *